No. 863,254. PATENTED AUG. 13, 1907.
G. BISHOP.
CURTAIN FASTENER.
APPLICATION FILED MAR. 16, 1907.

WITNESSES:
Allan Bennett.
Samuel Burgess.

INVENTOR:
GEORGE BISHOP.
per John E. Walsh
ATTORNEY.

THE NORRIS PETERS CO., WASHINGTON, D. C.

UNITED STATES PATENT OFFICE.

GEORGE BISHOP, OF LEEDS, ENGLAND.

CURTAIN-FASTENER.

No. 863,254.  Specification of Letters Patent.  Patented Aug. 13, 1907.

Application filed March 16, 1907. Serial No. 362,631.

*To all whom it may concern:*

Be it known that I, GEORGE BISHOP, a subject of the King of Great Britain and Ireland, residing at Leeds, in the county of York, England, have invented a new and useful Improvement in Curtain - Fasteners, of which the following is a specification.

This invention relates to improvements in fastening or retaining devices for securing the hoods or bonnets or other covers of automobiles, road vehicles, perambulators, and the like. The invention is also applicable for other similar purposes where it is required to secure two detachable portions in position.

The object is to construct a fastening device that will automatically lock and secure a detachable hood or other article in position upon, say, the vehicle, and as readily release the fastening device when it is desired to separate and remove the said hood or other article.

Figure 1:
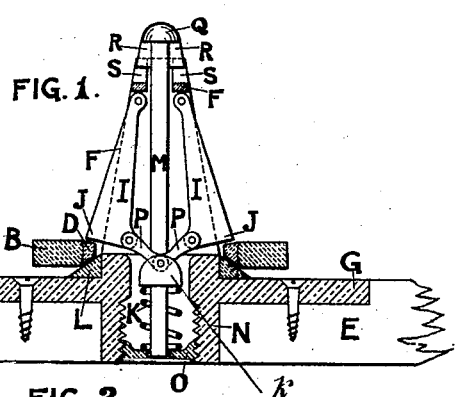
Figure 2:
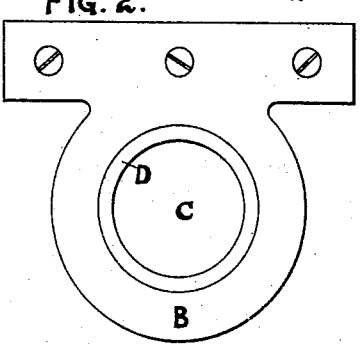
Figure 3:
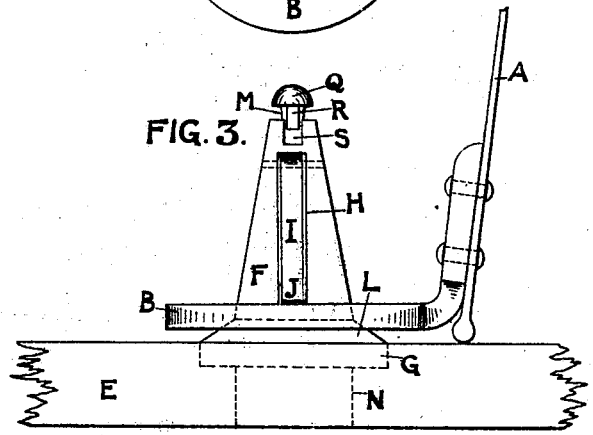

Figure 1 is a front elevation, in section, of my improved hood fastening device. Fig. 2 is a plan (detached) of the annular plate, bracket, or arm B hereinafter referred to and shown in Fig. 1. Fig. 3 is a side elevation of the fastening device as applied to a hood or bonnet A.

Similar letters of reference are employed to indicate corresponding parts throughout the several views.

According to my said invention I fix to any convenient part A of the hood, canopy, bonnet, or other cover or detachable portion, or to a strap or other connecting link attached thereto, a plate, bracket, or arm B, projecting therefrom at a suitable angle and containing a circular hole C, and with or without a boss and a steel or other inclined internal renewable collar or lining D. In some cases, the plate, bracket, or arm B is dispensed with and the detachable part A (or its connecting strap or link above referred to) is provided with an eyeleted hole.

To the fixed portion of the framework E, or other part of the automobile or vehicle, is fixed vertically a conical pin F, having a flange G with holes to receive screws for screwing it to the frame E, the sides of this pin F at its largest diameter being such that it will readily pass through the circular hole C in the said plate or bracket B, or the alternative eyeleted hole of the hood or cover A. A central longitudinal hole, of regular or variable diameter, is formed in the conical pin F, also one or more pairs of oppositely arranged longitudinal slots H. In each slot H is inserted and pivoted at its upper end a pendent lever I, each said lever terminating at its lower end in an inclined shoulder J. In their normal position the pair of levers I is caused by a spring K, or other suitable means, to expand and project beyond the outer surface of the conical pin F, but the said levers I are capable of being contracted or withdrawn within their respective slots H, when required, so as to offer no such projection beyond the outer surface of the said pin. The circular hole C in the said plate or bracket B, or the alternative eyeleted hole in the hood, cover, or other article to be secured, is passed over the conical pin F, and in so doing presses the pendent levers I inwards. As soon as the said hole C has cleared the levers, the latter expand to their normal position, as above described, the plate or bracket B (or the aforesaid alternative eyelet) being therefore tightly wedged between the inclined shoulders J of the levers and the upper surface of the flange G of the conical pin, thereby attaching and retaining the two parts securely in position. The said flange G may be provided with a renewable inclined steel collar or seating L. The shoulders J, being inclined, take up any possible wear and keep the ring B always tightly jammed, thereby preventing any possibility of rattling or working loose.

To release the plate or bracket B (or eyeleted portion of the hood or cover) when it is required to remove the same from the conical pin F, the pendent levers I are drawn within their respective slots H in the conical pin by means of a spring or other press pin M. The said press pin M is arranged within and to project from either the top or bottom (or both) of the conical pin F. A convenient way is to arrange the lower end of the pin M within a recess or sleeve N formed for its reception in the base of the conical pin F, in which sleeve N (having cap O) the spring K may also be arranged, in such a manner as to operate one or more sets of toggle levers P, these toggle levers P being arranged within the conical pin F and connected to the pendent levers I and also to the press pin M. The plate or cap O is screwed into the lower portion of the sleeve N, and the spring K is arranged to encircle the lower part of the slidable pin M between the plate O and a head or collar *k* which is secured on the said pin M. The press pin M may be provided with a head or cover Q having small side lugs or guides R working in notches S in the top of the conical pin F.

Although the herein described fastening device is described as being applied to the hoods, canopies, bonnets, or other covers of automobiles and other vehicles, it may also be used, as previously stated, for other similar purposes, such for instance as in connection with windows and doors.

I claim:

1. The combination, with a hollow guide-pin provided with slots and having means for securing it in position, of a spring-pressed pin slidable inside the said guide-pin, locking-levers pivoted to the said guide-pin at one end and projecting from its said slots, levers pivoted to the said slidable pin and to the other end portions of the said locking-levers, and a locking-ring which slides over the said guide-pin and which engages with the said locking-levers.

2. The combination, with a guide-pin provided with slots in its sides and having a flange at its base for securing it in position, of spring-pressed locking-levers slidable in the said slots, the upper parts of the said levers being pivoted to the upper part of the said pin and their lower end portions normally projecting from the said slots, a locking-ring which slides the said levers inwardly and which is retained between their said lower end portions and the said base flange, a central push-pin slidable in the said guide-pin, and links connecting the said push-pin with the said locking-levers.

GEORGE BISHOP.

Witnesses:
JOHN E. WALSH,
ALLAN BENNETT.